United States Patent
Beer et al.

(12) 
(10) Patent No.: US 8,051,048 B2
(45) Date of Patent: Nov. 1, 2011

(54) SYSTEM AND METHOD FOR AUTOMATED TRANSFER AND EVALUATION OF THE QUALITY OF MASS DATA OF A TECHNICAL PROCESS OR A TECHNICAL PROJECT

(75) Inventors: Peter Beer, Mannheim (DE); Andreas Liefeldt, Lünen (DE)

(73) Assignee: ABB Technology AG, Zurich (CH)

( * ) Notice: Subject to any disclaimer, the term of this patent is extended or adjusted under 35 U.S.C. 154(b) by 1060 days.

(21) Appl. No.: 11/785,859

(22) Filed: Apr. 20, 2007

(65) Prior Publication Data

US 2008/0052330 A1 Feb. 28, 2008

(30) Foreign Application Priority Data

May 8, 2006 (DE) .......................... 10 2006 021 543

(51) Int. Cl.
*G06F 7/00* (2006.01)
*G06F 17/00* (2006.01)
(52) U.S. Cl. ........................................ 707/690; 707/701
(58) Field of Classification Search .................... 707/690
See application file for complete search history.

(56) References Cited

U.S. PATENT DOCUMENTS

| 5,673,266 | A | 9/1997 | Li | |
|---|---|---|---|---|
| 6,253,213 | B1 | 6/2001 | Vanderschaaf | |
| 7,685,261 | B1 * | 3/2010 | Marinelli et al. | 709/220 |
| 2005/0251535 | A1 | 11/2005 | Theissen et al. | |
| 2006/0106473 | A1 * | 5/2006 | Enright et al. | 700/96 |

FOREIGN PATENT DOCUMENTS

| JP | 59-200934 A | 11/1984 |
|---|---|---|
| WO | WO 00/13112 | 3/2000 |

OTHER PUBLICATIONS

Annoymous, "Data Conversion Toolkit" IBM Technical Disclosure Bulletin, 1995, vol. 38, No. 11 pp. 477-480, XP-002176083.
Kamal Hathi, "An Introduction to SQL Server 2005 Integration Services" Microsoft TechNet SQL Server T., Internet Article (Online), 2005, pp. 1-13, XP-002443218.
European Search Report dated Aug. 2, 2007.
Germany Search Report dated Feb. 26, 2007.

* cited by examiner

*Primary Examiner* — Angela Lie
*Assistant Examiner* — Kris Mackes
(74) *Attorney, Agent, or Firm* — Buchanan Ingersoll & Rooney PC

(57) ABSTRACT

The invention relates to a system and a method for automated transfer and subsequent evaluation of the quality of mass data of a technical process or a technical project in a standardized environment (70) of one or more data processing devices with an assignment module (20) for allocating the mass data from one or more data sources (10) to structure elements in the standardized environment of the data processing device (70) and for generating a defined mapping of the mass data to be read in. The assignment module (20) interacts with a read-in module (30), into which the mass data can be read in an automated operation according to the selected assignment. The data read in can be fed to a checking module (40) for automated checking and/or for generation of a report for evaluation of the quality of the measured data read in. The check results generated by the checking module (40) can be fed to a processing module (60) for automated logging in predefined structures, and the results of the check can be transferred into the standardized environment (70) of the data processing device.

16 Claims, 1 Drawing Sheet

Figure 1:
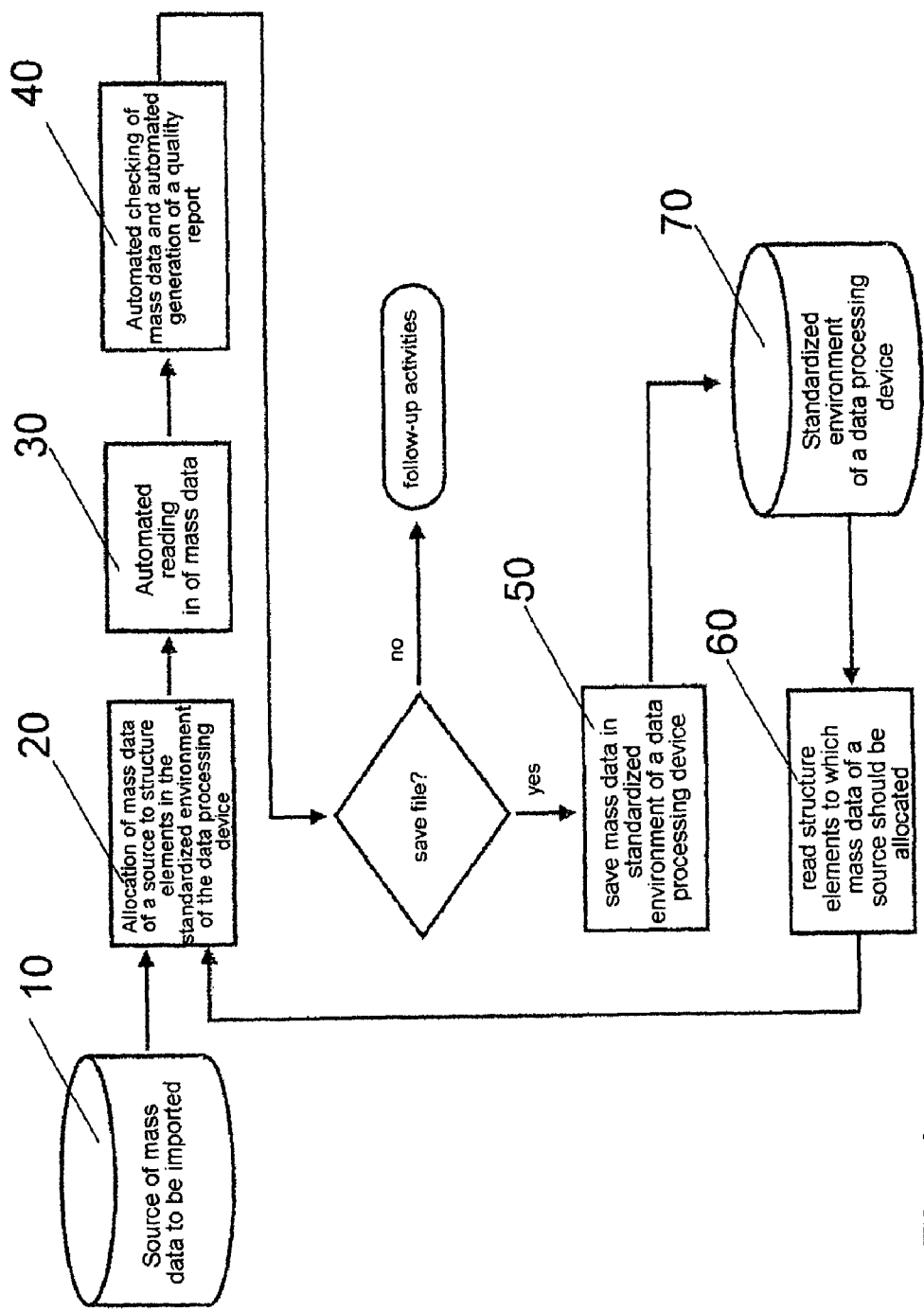

SYSTEM AND METHOD FOR AUTOMATED TRANSFER AND EVALUATION OF THE QUALITY OF MASS DATA OF A TECHNICAL PROCESS OR A TECHNICAL PROJECT

The invention relates to a system and a method for automated transfer and evaluation of the quality of mass data (characterized and structured in any desired form) of a technical process or a technical project into a standardized environment of one or more data processing devices. The invention is used in particular in plant engineering, control and instrumentation, and process planning.

Methods already exist for automated reading in of mass data into data processing devices, but no automated evaluation of the quality of this data is performed relating in particular to the completeness, the consideration of changes and the recognition of errors on reading the data, with a selective reply message to a user. There are also no procedures for reporting back the quality of the read data to a user in a specific form, characterized for example by a similar format and/or a similar sorting to the imported data. Thus so far it has not been possible for a user to make a direct comparison of data to be read in and corresponding reply messages, in order to evaluate the quality of the data which was read, and/or thereby to deduce appropriate actions.

To assess the quality of mass data automatically read in, a user currently compares this read data in its underlying original format, for example a list, separately and manually with the data presented through an output device of the data processing device.

The disadvantages arising from the manual comparison of mass data to be read in and having been read in are based on the disproportionate amount of time required. Furthermore, the time taken for this comparison cannot be at all accurately estimated, but is proportionally related to the quantity of mass data read.

The expense incurred by the manual comparison of all read mass data with the original data must also be regarded as very high, and is likewise proportional to the quantity of mass data read in. This manual comparison activity, to be carried out by one or more users, very often leads to errors, which furthermore cannot necessarily be reproduced. As a result of the non-standard presentational form of the mass data on which this comparison is generally based, communication with the supplier(s) of this data is made more difficult and can in turn lead to an increased time requirement and/or increased expense in the project planning and/or execution.

Since an evaluation of the mass data can only be performed after the reading operation, previously existing datasets of the technical process can be overwritten, deleted and/or changed, without the user planning or intending this.

Starting from the described disadvantages, the invention is based on the object of specifying a system and a method for automated transfer and subsequent evaluation of the quality of mass data (characterized and structured in any desired form) of a technical process or a technical project into a standardized environment of one or more data processing devices, whereby aforementioned disadvantages of prior art are overcome.

Advantageous developments and improvements of the system according to the invention, and a method for executing the system, are given in the description.

The system according to the invention, for automated transfer and subsequent evaluation of the quality of mass data (characterized and structured in any desired form) of a technical process or a technical project into a standardized environment of one or more data processing devices, includes an assignment module for allocating the mass data from one or more data sources to structure elements in the standardized environment of the data processing device. The assignment module further generates a defined mapping of the mass data to be read in.

The assignment module interacts with a read-in module, which reads in the mass data in an automated operation according to the selected assignment and feeds it to a checking module for automated checking and for generation and/or visualization of a report, which evaluates the quality of the mass data which was read. This evaluation relates for example to the correctness, the completeness, the consistency, the validity, the applicability of the features, the identifiers and/or value ranges of the mass data.

The checking module interacts with a storage module, which stores the results of the check in the standardized environment of the data processing device and/or in an external file. A processing module interacting with the storage module performs an automated logging of the results of the check in predefined structures, and transfers the results of the check into the standardized environment of the data processing device.

Thus with the system according to the invention the quality of the mass data read in is advantageously evaluated and reported back to the user.

In an advantageous embodiment of the system according to the invention, it is provided that for example the correctness, the completeness, the consistency, the validity, the applicability of certain features, the identifiers and/or value ranges of the mass data are presented by means of a display module and/or supplied for further processing.

The method can achieve automated transfer and subsequent evaluation of the quality of mass data of a technical process or a technical project into a standardized environment of one or more data processing devices.

The method according to the invention is based on the reading in of mass data (characterized and structured in any desired form) into a standardized environment of a data processing system, in an automated operation and/or with support. The quality of the mass data read in is evaluated and reported back to the user.

For this, in a first step the mass data is transferred from one or more data sources to an assignment module. By means of the assignment module, mass data from the data source is allocated structure elements in the standardized environment of the data processing device, and a defined mapping is generated of the mass data to be read in.

In a further step, the mass data is read in an automated operation into a read-in module according to the selected assignment by means of the assignment module, and is then fed to a checking module for automated checking and for the generation of a report, which evaluates the quality of the mass data which was read in.

By means of a storage module, selected results of the check are in a next step stored in the standardized environment of the data processing device and/or in an external file.

In a subsequent step, an automated logging of the selected results of the check is performed in predefined structures by means of a processing module, and the results of the check are transferred in a last step into the standardized environment of the data processing device.

The method and system according to the invention for automated reading in of mass data into one or more data processing devices advantageously includes an automatic visualization of the correctness, the completeness, the consistency, the validity, the applicability of certain features, the identifiers and/or value ranges of the mass data.

Furthermore, with the system and method according to the invention, it is possible for syntactic, semantic, formal errors and those of content and/or other defects of the read mass data to be detected, evaluated and/or visually represented, this advice and evaluation being presented both in detail and also as condensed information. These presentations thus serve the purpose of a quality statement for the read mass data.

The advantages of the described method are based on a simplified communication with the supplier(s), and the processing and/or interpretation of the mass data which is read in or to be read in. The method according to the invention supports the acceptance of information and specifications from the process suppliers, for example.

Statements about the quality and/or quantity of the imported mass data are also possible, so that any necessary actions, such as correction of data, can more easily and economically be identified, planned and/or executed after the reading of the mass data. The described method further allows archiving and/or history formation from the results obtained for the read data during the check. As a result of this, changes to the data read in or to be read in at different times advantageously become subsequently traceable.

The method enables simplified error detection and/or correction through the identification of incorrect and/or missing mass data. In renewed read operations of the mass data at later times, the method according to the invention enables automated advice of changes between previously read mass data and the mass data currently to be read in and/or the currently read data records.

It is also possible with the method according to the invention to obtain information about mass data which had not yet been read in earlier read operations and which is unknown at the current time of reading in.

Since the mass data is not transferred into the standardized environment of one or more data processing devices until an evaluation of the quality as described above for the read mass data has been done, the original dataset is only changed selectively and reproducibly in this standardized environment.

The system and method according to the invention are preferably provided for reading in data for engineering projects and/or processes, for example in plant engineering, control and instrumentation and process planning, the mass data of these processes or projects preferably being process and procedure data that is supplied in the form of consumer lists and/or instrumentation lists. In principle the system and method according to the invention can be applied in all fields in which an automated reading of mass data is possible and a reply about the quality of the data that was read in is wanted or required.

The system and method according to the invention are preferably used in process planning, system planning or control and instrumentation planning. However, they can also be applied in technical planning, as for example in process engineering, plant engineering, system engineering, automation engineering, electrical engineering and cabling.

With the help of an embodiment of the invention shown in the accompanying drawing, the invention, advantageous developments and improvements of the invention and special advantages of the invention should be further explained and described.

The single FIG. 1 shows an example of a method for automated transfer and subsequent evaluation of the quality of mass data (characterized and structured in any desired form) into a standardized environment 70 of a data processing device, the mass data being supplied from a data source 10 to an assignment module 20. By means of the assignment module 20, the mass data from the data source 10 is allocated to structure elements in the standardized environment 70 of the data processing device, and a defined mapping is generated of the mass data to be read in. The mass data is read in an automated operation into a read-in module 30 according to the selected assignment by means of the assignment module 20, and fed to a checking module 40 for automated checking and for the generation of a quality report. The quality report is a list, for example, which shows which data was not recorded.

Selected results of the check in the standardized environment 70 of the data processing device are saved by means of a storage module. By means of a processing module 60 an automated logging of the selected results of the check is performed in predefined structures, and the results of the check are transferred into the standardized environment 70 of the data processing device.

An example of the procedural steps of the method according to the invention is given below.

In a first step, an assignment is in each case executed manually exactly once by means of the assignment module 20, of an item of mass data to be read to the data in the method, and/or for each item of mass data to be read in for the first time.

This results in a defined mapping of the mass data to be read in to the method and/or system with which the mass data is read in.

In a subsequent step, the mass data is read in an automated operation according to the selected assignment by means of the read-in module 30. The subsequent check by the checking module 40 of each item of mass data read in is dependent on the particular technical process or project. Criteria for checks are for example the length of character strings, the analysis of regular expressions such as the power plant's identification system, agreement with possible entries of datasets of the target system and/or completeness, e.g. mandatory entries, of the mass data.

After the reading and checking of the mass data in the read-in and checking modules 30/40, each item of mass data has exactly one of the following nine states:
Mass data item is new in comparison to the previous read operations
    Mass data item was
        read in with error(s) (state 1)
        read in without errors (state 2)
Mass data item is present, but changed in one or more features compared to previous read operations
    Mass data item was
        read in with error(s) (state 3)
        read in without errors (state 4)
Mass data item is no longer present after the current read operation, i.e. it was deleted in comparison to the previous read operations
    Mass data item was
        read in with error(s) (state 5)
        read in without errors (state 6)
Mass data item is identical in comparison to previous read operations after the current read operation
    Mass data item was
        read in with error(s) (state 7)
        read in without errors (state 8)
Mass data item could not be read in the current read operation. No statement is possible about a change in comparison to previous read operations (state 9)

The states, or results of the checks, are visualized for each checked mass data item and/or an aggregation of checked mass data, for example by a unique assignment of colors, symbols, patterns and/or other distinguishing features. The results of these checks are stored internally, i.e. in the standardized environment of the data processing device, and/or externally in a file, for example in HTML, XML or ASCII format.

In a next step, an automated logging occurs in a predefined structure, containing information about the existence, the completeness, the sense, the validity and/or the change of the imported mass data. This structure can be identical to the structure of the data to be read in, or can be newly defined.

The data which was selected on the basis of the states communicated by the described method is only in a final step transferred into the standardized environment of the data processing device.

Overall the described method requires maintenance of metrics to assess the quality of the mass data read in. Since the metrics vary according to the nature of the mass data to be read in, and in the particular technical projects and processes, a new set of metrics is created and maintained for each technical process being observed or each project.

The invention claimed is:

1. System for automated change of an original dataset of process and procedure mass data of a technical process or a technical project in a standardized environment of one or more data processing devices, comprising:
   a micro processor coupled to a memory arranged as:
      an assignment module for allocating mass data, which are to be read in from one or more data sources to structure elements in the standardized environment of the data processing device and for generating a defined mapping of the mass data to be read in;
      a read-in module, interacting with the assignment module, into which the mass data is read in an automated operation according to the selected assignment;
      a checking module, wherein the mass data read in is fed to the checking module for applying metrics to assess the quality of the mass data by automated checking of at least one of the legitimacy of the data type, the legitimacy of the length of character strings, the analysis of regular expressions, the agreement with possible entries of datasets of a target system and the completeness of the mass data and for generation of check results of the quality of the mass data read in; and
      a processing module, wherein the check results generated by the checking module are fed to the processing module for automated logging in predefined structures, in which the predefined structures contain information about at least one of an existence, a completeness, a sense, a validity and a change of the fed mass data, and after the evaluation of the quality of the fed mass data by the checking module, the results of the check and mass data which is selected on the basis of the check results are transferred into the standardized environment of the data processing device.

2. System according to claim 1, wherein the mass data is characterized and structured in any desired form.

3. System according to claim 2, wherein a display module is provided, which performs at least one of visualizing the results of the check and supplying the results of the check for further processing.

4. System according to claim 3, wherein the check results supplied by the checking module are stored internally in at least one of the standardized environment of the data processing device and on an external storage medium as a file.

5. System according to claim 1, wherein the check results supplied by the checking module are stored internally in at least one of the standardized environment of the data processing device and an external storage medium as a file.

6. System according to claim 1, wherein the predefined structures are identical to the structure of the data to be read in.

7. System according to claim 1, wherein the predefined structures are newly defined.

8. System according to claim 1, wherein the predefined structures are identical to the structure of the data to be read in.

9. System according to claim 1, wherein the predefined structures are newly defined.

10. System according to claim 1, wherein the mass data subject to at least one of automated checking and generation of a report is compared to previously read in mass data.

11. System according to claim 1, wherein the mass data is determined to be in one of the following states:
    mass data is new in comparison to a previous read operation,
    mass data was read in with error(s) (state 1), or read in without errors (state 2);
    mass data is present, but changed in one or more features compared to previous read operations,
    mass data was read in with error(s) (state 3), or read in without errors (state 4);
    mass data is no longer present after a current read operation,
    mass data was read in with error(s) (state 5), or read in without errors (state 6);
    mass data is identical in comparison to previous read operations after the current read operation,
    mass data was, read in with error(s) (state 7), read in without errors (state 8); and
    mass data could not be read in, in the current read operation, no statement is possible about a change in comparison to previous read operations (state 9).

12. Method for automated change of an original dataset of process and procedure mass data of a technical process or a technical project into a standardized environment of one or more data processing devices, comprising:
    a microprocessor coupled to a storage module that:
       allocates the mass data which are to be read in from one or more data sources to structure elements in the standardized environment of the data processing device, and generate a defined mapping of the mass data to be read in by an assignment module;
       reads in the mass data in an automated operation into a read-in module according to the selected assignment by the assignment module, and feeds the mass data to a checking module for applying metrics to assess the quality of the mass data by automated checking of at least one of the legitimacy of the data type, the legitimacy of the length of character strings, the analysis of regular expressions, the agreement with possible entries of datasets of a target system and the completeness of the mass data and generation of check results of the quality of the measured values read in; and
       automated logging of the selected results of the check is performed in predefined structures, in which the predefined structures contain information about at least of one of an existence, a completeness, a sense, a validity and a change of the fed mass data, and after the evaluation of the quality of the fed mass data by using the checking module, the results of the check, and the mass data which is selected on the basis of the check results, are transferred into the standardized environment of the data processing device.

13. Method according to claim 12, comprising:
at least one of storing the results of the check by the storage module, visualizing the results by a display module and supplying the results for further processing.

14. Method according to claim 13, wherein the check results supplied by the checking module are stored internally in at least one of the standardized environment of the data processing device and on an external storage medium as a file.

15. Method according to claim 12, comprising:
storing the check results supplied by the checking module internally in at least one of the standardized environment of the data processing device and an external storage medium as a file.

16. System for automated change of an original dataset of process and procedure mass data of a technical process or a technical project, comprising:
a microprocessor coupled to a memory arranged as:
an assignment module for allocating mass data which are to be read in from one or more data sources to structure elements in a standardized environment of a data processing device and for generating a defined mapping of the mass data;
a read-in module to read the mass data in an automated operation according to a selected assignment;
a checking module for applying metrics to assess the quality of the mass data to check at least one of the legitimacy of the data type, the legitimacy of the length of character strings, the analysis of regular expressions, the agreement with possible entries of datasets of a target system and the completeness of the mass data and to generate check results for evaluation of the quality of the measured data read in; and
a processing module for automated logging in predefined structures, in which the predefined structures contain information about at least of one of an existence, a completeness, a sense, a validity and a change of the fed mass data, and after the evaluation of the quality of the fed mass data by using the checking module, the results of the check, and mass data which is selected on the basis of the check results are transferred into the standardized environment of the data processing device.

* * * * *